Dec. 6, 1938.   R. A. AVERY   2,139,646
VEHICLE BRAKE
Filed Feb. 21, 1938   2 Sheets-Sheet 1
Fig. 1.
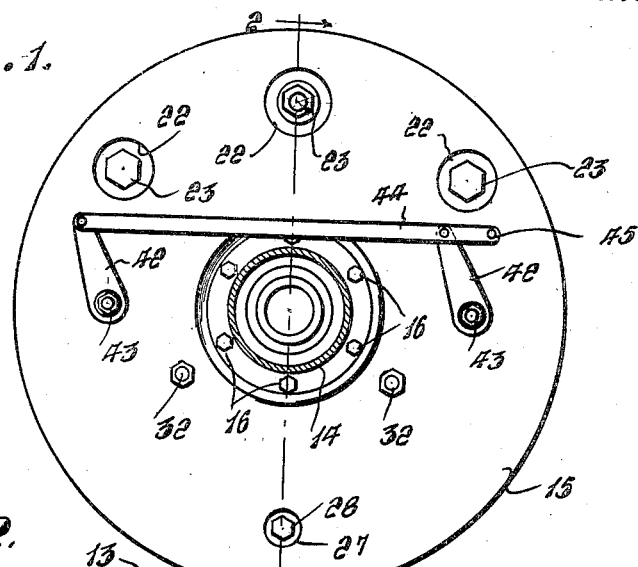
Fig. 2.
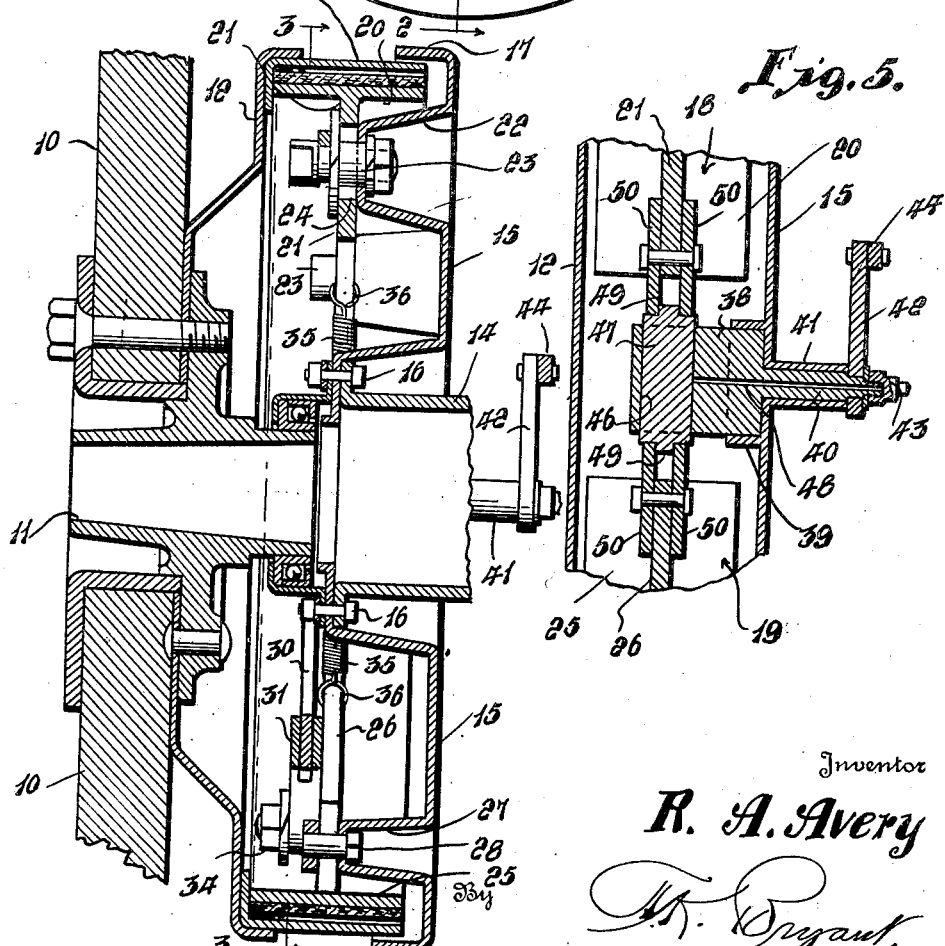
Fig. 3.
Inventor
R. A. Avery
By T. R. Bryant
Attorney

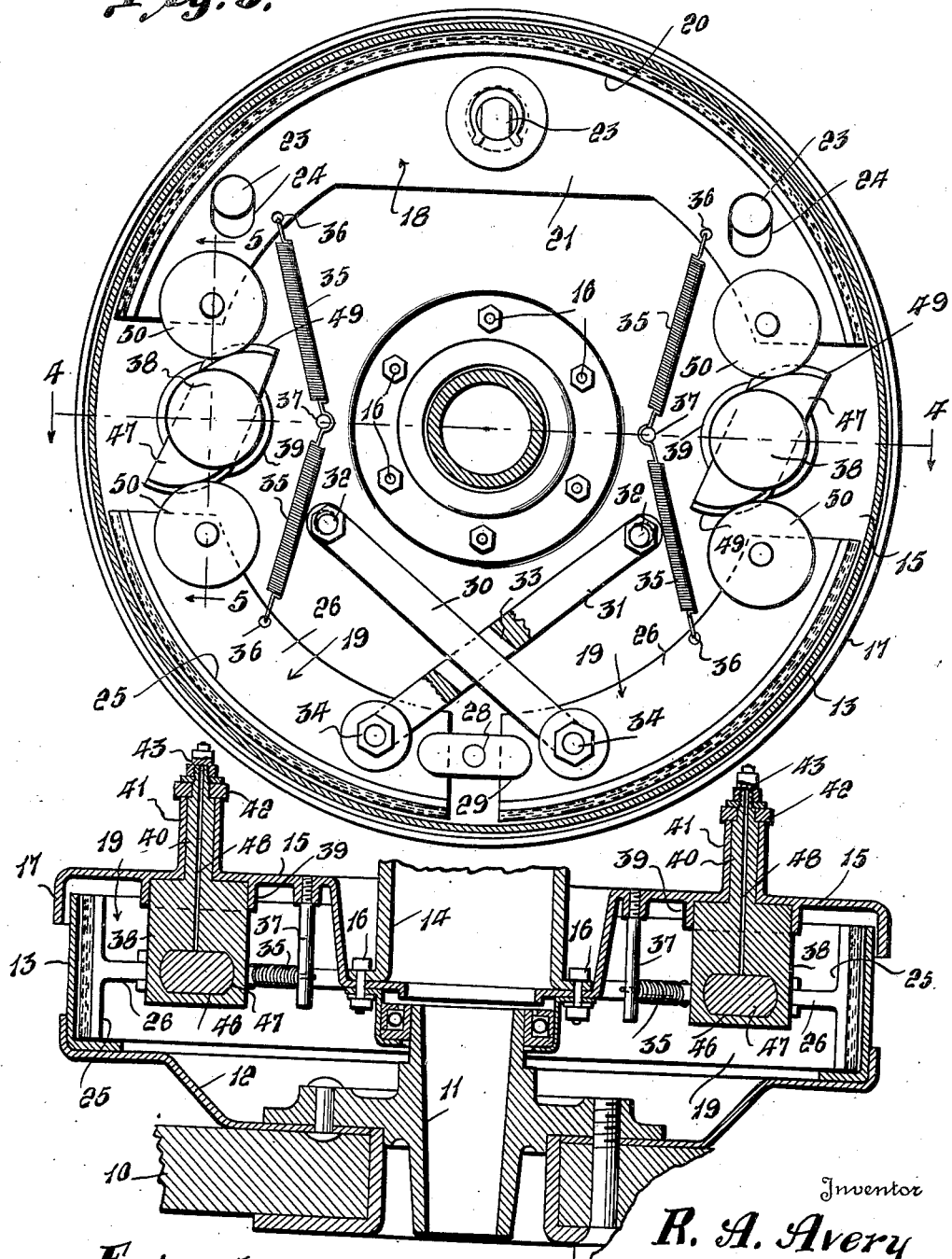

Patented Dec. 6, 1938

2,139,646

UNITED STATES PATENT OFFICE 2,139,646

VEHICLE BRAKE

Rube A. Avery, Hot Springs, Ark.

Application February 21, 1938, Serial No. 191,768

11 Claims. (Cl. 188—78)

This invention relates to certain new and useful improvements in vehicle brakes.

The primary object of the invention is to provide a vehicle brake of the mechanical type that is manually operable, the brake comprising the usual brake drum rotatable with a wheel with three brake shoe elements, one of which is of a radially slidable type with cam devices for the simultaneous operation of the three brake shoe elements, resulting in the even application of brake shoe pressure on the brake drum.

A further object of the invention is to provide a vehicle brake of the foregoing character with a single radially slidable brake shoe disposed opposite a pair of supported brake shoes with a pair of slidably mounted brake shoe operating cam bars respectively positioned between the ends of the floating brake shoe and the outer ends of the pair of supported brake shoes.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is an inner side elevational view, partly in section of a vehicle brake constructed in accordance with the present invention;

Figure 2 is a vertical cross-sectional view taken on line 2—2 of Figure 1;

Figure 3 is a vertical sectional view taken on line 3—3 of Figure 2 showing the radially slidable brake shoe and the pair of supported brake shoes with the slidably mounted operating cam bars interposed between the brake shoes;

Figure 4 is a cross-sectional view taken on line 4—4 of Figure 3 showing the rotatably mounted blocks and the brake shoe operating cam bars slidable therein; and Figure 5 is a detail sectional view taken on line 5—5 of Figure 3, showing the roller connections between the brake shoes and slidable shoe operating cam bar.

The mechanical brake is associated with the wheel of a vehicle and said wheel 10 includes a hub 11 that carries at the inner side thereof an annular offset flange 12 to which an annular brake drum 13 is secured in the usual manner.

The brake shoes associated with the drum 13 and the supporting devices therefor are carried by a non-rotatable part of the vehicle, such as an axle housing 14 and the support for the brake shoes comprises a disk 15 dished in the center thereof and anchored as at 16 to the axle housing 14, the marginal edge of the disk 15 carrying a laterally directed annular flange 17 that overlies the adjacent edge of the brake drum 13.

The brake shoes for the brake drum 13 are associated with the inner side of the disk 15, the brake shoe 18 being of the radially slidable type and possessing substantially the same braking surface as the two brake shoes 19 that are adjustably supported on the disk 15 opposite the brake shoe 18. The brake shoe 18 includes the usual cross head 20 provided on its outer face with brake material, and an inwardly directed web 21. To accommodate the slidable mounting of the brake shoe 18 upon the inner face of the disk 15, the latter at spaced points adjacent the marginal edge thereof is formed with depressed wall portions 22 having openings in the bottoms thereof for the passage and support of nut and bolt combinations 23 that also pass through slotted openings 24 formed in the web 21 of the brake shoe 18 with the longitudinal axes of the slotted openings 24 being parallel and extending transversely of the brake shoe 18 whereby the latter is permitted to slide in a direct radial path relative to the disk 15 for engagement over the entire area of the curved head 20 with the brake drum 13. The brake shoe 18 is of the radially slidable type and is retained in proper position on the disk 15 by the bolt and nut combinations 23.

The brake shoes 19 are of identical construction, each comprising an arcuate cross head 25 and a web 26, the disk 15 having a depressed portion 27 with an opening in the bottom thereof for the passage of a bolt 28 that carries a cross piece 29 on its inner end that overlaps the spaced adjacent ends of the two webs 26 of the brake shoes 19, the adjacent ends of said webs being maintained by said bolt 28 and cross piece 29 in contact with the bottom wall of the depressed portion 27 of the disk 15 to restrain the brake shoes 19 from vibratory movement. A pair of anchor straps is associated with the adjacent ends of the brake shoes 19 and as shown more clearly in Figure 3, the two straps 30 and 31 being adjustably mounted at their inner ends by means of an eccentric as at 32 on the disk 15, the strap 30 passing through a slotted opening 33 in the strap 31 while the outer ends of said straps 30 and 31 are pivotally attached as at 34 to the adjacent ends of the webs 26 of the two brake shoes 19. The brake shoe 18 and the pair of brake shoes 19 are normally drawn towards each other and out of contact with the brake drum 13 by means of coil springs 35 anchored at their outer ends as at 36 to the webs 21 and 26 of the brake shoes 18 and 19 respectively while the inner ends of the springs 35 are anchored to pins 37 shown in Figures 3 and 4 as projecting from the inner side of the disk 15 in line with the wheel hub 11.

The operating means for the brake shoes 18 and 19 include a pair of slidably mounted cam bars respectively arranged between the ends of the brake shoe 18 and the outer ends of the brake shoes 19 and as shown more clearly in Figures 3 to 5, the sliding cam bars and their mountings each include a cylindrical block 38 rotatably mounted at one end in an annular bearing flange 39 at the inner side of the disk 15, the block 38 carrying a bearing stem 40 at one end thereof projecting through an opening in the disk 15 and rotatably supported in a bearing collar 41 carried by said disk. An arm 42 is anchored at one end to the bearing stem 40 outwardly of the bearing 41 and is retained in position thereon by anchor nuts 43, said arms 42 being connected by a rod 44 to the end 45 of which brake applying devices are connected for the simultaneous operation of the bearing blocks 38. Each bearing block 38 has a transverse opening 46 therein adjacent the inner end thereof and in which opening a cam bar 47 is slidably mounted, lubrication for the cam bar being afforded by the axial longitudinal oil port 48 extending through the block 38 and bearing stem 40 to the outer end of the latter. Each end of the cam bar 47 is provided with an arcuate cam rib 49 located centrally thereof midway the opposite sides of the cam bar to provide cam tracks as clearly shown in Figure 5 for pairs of rollers 50 rotatably mounted upon adjacent ends of the webs 21 and 26 of the brake shoes 18 and 19 respectively.

The springs 35 normally hold the brake shoes 18 and 19 in spaced relation to the brake drum 13 and with the rollers 50 carried by the ends of said brake shoes in engagement with the cam tracks 49 upon the opposite ends of the cam bars 47. When the rod 44 is shifted, movement thereof is imparted to the arms 42 and rotatable blocks 38 for the operation of the cam bars 47 and as the latter are freely slidable through the bearing blocks 38, an even application of pressure through the medium of the rollers 30 is applied to the brake shoes 18 and 19 for moving such brake shoes into frictional engagement with the brake drum 13. Adjustment of the brake shoes is accomplished by the adjustable mountings 32 for the inner ends of the straps 30 and 31 that are pivotally connected to the brake shoes 19.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:

1. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoe being of the radially slidable type and cam devices interposed between the ends of the radially slidable brake shoe and the outer ends of the other pair of brake shoes, crossed arms adjustably mounted at their inner ends on the disk and pivotally mounted at their outer ends on adjacent ends of said pair of brake shoes.

2. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoe being of the radially slidable type and cam devices interposed between the ends of the radially slidable brake shoe and the outer ends of the other pair of brake shoes, and the cam devices including slidably mounted cam bars and cooperating rollers on the brake shoes engaged with the cam bar.

3. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoe being of the radially slidable type and cam devices interposed between the ends of the radially slidable brake shoe and the outer ends of the other pair of brake shoes, crossed arms adjustably mounted at their inner ends on the disk and pivotally mounted at their outer ends on adjacent ends of said pair of brake shoes, and the cam devices including slidably mounted cam bars and cooperating rollers on the brake shoes engaged with the cam bar.

4. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoe being of the radially slidable type and cam devices interposed between the ends of the radially slidable brake shoe and the outer ends of the other pair of brake shoes, and each of the cam devices including a block rotatably mounted on the disk, a cam bar transversely slidable through the block and cooperating rollers on the brake shoes engaged with adjacent ends of the cam bar.

5. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoe being of the radially slidable type and cam devices interposed between the ends of the radially slidable brake shoe and the outer ends of the other pair of brake shoes, crossed arms adjustably mounted at their inner ends on the disk and pivotally mounted at their outer ends on adjacent ends of said pair of brake shoes, and each of the cam devices including a block rotatably mounted on the disk, a cam bar transversely slidable through the block and cooperating rollers on the brake shoes engaged with adjacent ends of the cam bar.

6. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoe being of the radially slidable type and cam devices interposed between the ends of the radially slidable brake shoe and the outer ends of the other pair of brake shoes, and each of the cam devices including a block rotatably mounted on the disk, a cam bar transversely slidable through the block and cooperating rollers on the brake shoes engaged with adjacent ends of the cam bar, and each end of the cam bar having spaced cam tracks over which the rollers move.

7. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoes being of the radially slidable type and cam devices interposed between the ends of the radially slidable brake shoe and the outer ends of the other pair of brake shoes, crossed arms adjustably mounted at their inner ends on the disk and pivotally mounted at their outer ends on adjacent ends of said pair of brake shoes, and each of the cam devices including a block rotatably mounted on the disk, a cam bar transversely slidable through the block and cooperating rollers on the brake shoes engaged with adjacent ends of the cam bar, and each end of the cam bar having spaced cam tracks over which the rollers move.

8. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoe being of the radially slidable type and cam devices interposed between the ends of the radially slidable brake shoe and the outer ends of the other pair of brake shoes, and each of the cam devices including a block rotatably mounted on the disk, a cam bar transversely slidable through the block and cooperating rollers on the brake shoes engaged with adjacent ends of the cam bar, and means connecting said blocks for the simultaneous operation of the cam bars.

9. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoe being of the radially slidable type and cam devices interposed between the ends of the radially slidable brake shoe and the outer ends of the other pair of brake shoes, crossed arms adjustably mounted at their inner ends on the disk and pivotally mounted at their outer ends on adjacent ends of said pair of brake shoes, and each of the cam devices including a block rotatably mounted on the disk, a cam bar transversely slidable through the block and cooperating rollers on the brake shoes engaged with adjacent ends of the cam bar, and means connecting said blocks for the simultaneous operation of the cam bars.

10. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoe being of the radially slidable type and cam devices interposed between the ends of the radially slidable brake shoe and the outer ends of the other pair of brake shoes, and each of the cam devices including a block rotatably mounted on the disk, a cam bar transversely slidable through the block and cooperating rollers on the brake shoes engaged with adjacent ends of the cam bar, and each end of the cam bar having spaced cam tracks over which the rollers move, and means connecting said blocks for the simultaneous operation of the cam bars.

11. In a vehicle brake of the character described, a rotatable brake drum and a stationary disk, three brake shoes carried by the disk, one of the brake shoes having a braking surface substantially equal to the braking surface of the other two shoes, the latter shoes being spaced from each other at adjacent ends, the larger brake shoes being of the radially slidable type and cam devices interposed between the ends of the radially slidable brake shoe and the outer ends of the other pair of brake shoes, crossed arms adjustably mounted at their inner ends on the disk and pivotally mounted at their outer ends on adjacent ends of said pair of brake shoes, and each of the cam devices including a block rotatably mounted on the disk, a cam bar transversely slidable through the block and cooperating rollers on the brake shoes engaged with adjacent ends of the cam bar, and each end of the cam bar having spaced cam tracks over which the rollers move, and means connecting said blocks for the simultaneous operation of the cam bars.

RUBE A. AVERY.